United States Patent Office 3,291,838
Patented Dec. 13, 1966

3,291,838
PREPARATION OF KETONES
Raymond E. Maginn, Columbus, Ohio, assignor to Ethyl Corporation, New York, N.Y., a corporation of Virginia
No Drawing. Filed May 8, 1963, Ser. No. 278,987
7 Claims. (Cl. 260—591)

This invention relates to a novel process for the preparation of ketones.

It is an object of this invention to provide a process for the preparation of ketones which comprises reacting a substituted aromatic compound with a chromium carbonyl compound. A further object is to provide a ketone synthesis comprising the reaction of a substituted aromatic compound with an isonitrile chromium pentacarbonyl. Additional objects will be apparent from the following discussion and claims.

The objects of this invention are accomplished by providing a process for the preparation of ketones which comprises reacting a compound having the formula.

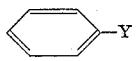

wherein Y is an ortho-para directing substituent which activates the benzene ring and which is free from hydrogens which are more reactive than the activated hydrogens substituted on said benzene ring, with a reactant having the formula

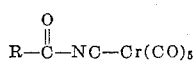

wherein R is a hydrocarbon radical having from 1 to about 16 carbon atoms.

A particularly preferred embodiment of this invention is a process for the preparation of a ketone, said process comprising reacting a compound selected from the class consisting of

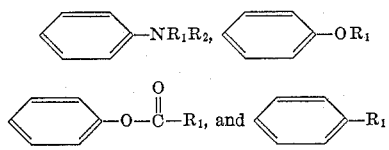

wherein $R_1$ and $R_2$ are hydrocarbon radicals having from 1 to about 8 carbon atoms, said radicals being selected from the class consisting of alkyl, aryl, cycloalkyl alkaryl, aralkyl and alkenyl radicals, with an acy isonitrile chromium pentacarbonyl having the formula

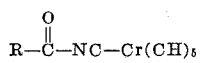

wherein R is a hydrocarbon radical having from 1 to about 16 carbon atoms, said radical selected from the class consisting of alkyl, cycloalkyl, aralkyl, aryl, alkaryl, alkenyl and cycloalkenyl radicals.

The isonitrile chromium pentacarbonyl compounds employed in this process are disclosed in my copending application, Serial No. 183,395, filed March 29, 1962, now U.S. Patent No. 3,136,797. The contents of that application are incorporated by reference herein as if fully set forth.

The radical R in the above formula can be selected from a wide variety of organic radicals; that is, they are composed solely of carbon and hydrogen.

Compounds which contain other groups attached to the carbon chain of the radial R are applicable. Hence, compounds such as chloropropionyl isonitrile chromium pentacarbonyl, p-aminobenzoyl isonitrile chromium pentacarbonyl, m-nitrobenzoyl isonitrile chromium pentacarbonyl and 5-hydroxypentoyl isonitrile chromium pentacarbonyl and applicable in the invention.

The radical R in the above formula may be an alkyl radical having either a straight or branched chain. Non-limiting examples of this type of radical are the methyl, ethyl, isopropyl, amyl and 3-hexyldecyl radicals. Similarly, R may be an alkenyl radical such as the isopropenyl and 4-hexenyl radicals. R may contain two or more olefinic bonds. Radicals containing two olefinic bonds are the 1,3-pentadienyl radical and the like. R may contain one or more triple bonds.

R may be an alicyclic radical. Thus, for example, R may be a cyclohexyl or cyclopentyl radical. The alicyclic radical may contain olefinic bonds. Illustrative radicals of this type are the cyclopentenyl and 1,3-cyclohexadienyl radicals.

Furthermore, the cyclic radicals described and illustrated above may be substituted by aliphatic or aromatic substituents. Aralkyl radicals such as the phenylcyclohexenyl radicals and phenylcyclohexyl radicals are non-limiting examples of this type. Non-limiting examples of alkyl substituted alicyclic radicals are the ethylcyclohexyl, dimethylcyclohexyl and 1-methyl-3-cyclohexyl radicals.

Aralkyl radicals such as the $\beta$-phenylethyl and $\beta$-phenylbutyl radicals are also applicable.

R may also be a univalent aromatic radical. Non-limiting examples of applicable aromatic radicals re the phenyl, biphenylyl, naphthyl, 2,3-xylyl, and p-cumenyl radicals.

The exact structure configuration of the radical R is not critical. No limitation as to size or complexity of the radical has been found. However, the preferred radicals have one to about 16 carbon atoms. The most preferred radicals are those selected from the class consisting of alkyl, cycloalkyl, aralkyl, aryl, alkaryl, alkenyl and cycloalkenyl radicals. Compounds incorporating these radicals are preferred since they are more easily prepared and/or many of the ketones from these compounds have greater commercial utility.

Any aromatic compound having a substituent which activates at least one hydrogen of the aromatic ring is applicable in the process of this invention provided that the substituent on the aromatic ring is free from hydrogen atoms which are more reactive than at least one of the hydrogen atoms on the aromatic ring. Particularly preferred reactants are benzene compounds, and the most preferred reactants are benzene compounds having substituents of the type described and illustrated above.

Illustrative but non-limiting examples of the tertiary amine compounds,

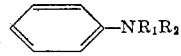

which are reactive according to this process are N,N-dimethylaniline, N,N-diethylaniline, N,N-di-n-hexylaniline, N,N-dicyclohexylaniline, N,N-diphenylaniline, N,N-di-4-cyclohexenylaniline, and the like.

Illustrative but non-limiting examples of the ethers which are applicable in this process include anisole, phenetole, phenyl sec-butyl ether, diphenylether, phenyl cyclohexyl ether, phenyl 2-cyclohexenyl ether, and the like.

Ester compounds which are applicable in this process includes the esters derived by reacting phenol with various organic acids. Illustrative but non-limiting examples of these types of ester include phenylacetate, phenylpropionate, phenylbenzoate, phenyl 2,4-dimethylbenzoate and the like.

Aromatic hydrocarbons which undergo the process of this invention include toluene, ethylbenzene, cyclohexyl-benzene, 4-cyclohexenylbenzene, 4-phenylpentene-2, and the like. In these compounds wherein the benzene ring is substituted by a radical containing a double bond, the double bond must be isolated; that is, the carbon atom adjacent to the benzene ring must be free of an olefinic linkage. Compounds of this type are illustrated by the compound 4-phenyl pentene-2, 5-phenylhexene-2, and the like.

The process conditions are not particularly critical since the reactants need only be brought together at reaction temperatures. Agitation of the reaction mixture is helpful and the reaction may be carried out in an inert atmosphere or in air if desired. In many instances the isonitrile chromium pentacarbonyl is sufficiently soluble in the aromatic compound to enable the process to be carried out without the use of a solvent. More than an equivalent quantity of aromatic compound can be employed, if necessary, to solubilize the isonitrile compound. Molar excesses of the aromatic reactant of from two to 100 moles or even higher can be employed. Frequently an excess of reactant not only serves as a solvent, but by the Law of Mass Action, serves to force the reaction to afford higher yields of product.

In general, any non-reactive solvent can be used although in many cases a solvent is not not necesary. Organic solvents are preferred. Typical inert solvents which may be employed are aliphatic hydrocarbons such as isooctane, nonane and the like, and hydrocarbon mixtures such as No. 9 oil and kerosene. Chlorinated solvents such as chloroform, carbon tetrachloride, trichloroethylene and the like can be employed if desired.

The process of this invention is effectively carried out at atmospheric pressure; however, in some instances, pressures as low as 10 mm. Hg or as high as 500 atmospheres can be employed if desired.

The process is usually carried out at a temperature within the range of from 15 to 200° C. Higher or lower temperatures can be employed if desired. It is preferred that the temperature be sufficiently high to afford a reasonable rate of reaction, but not so high as to destroy the products or the reactants. The preferred temperature range is 50 to 180° C.

The time require is not a true independent variable but is dependent upon the other process variables employed. Generally, when high temperatures and agitation are employed, there will be a proportionate decrease in the reaction time. When the process of this invention is folowed as illustrated by the above discussion and the following examples, reaction times in the order of one to 48 hours usually yield satisfactory results. The preferred reaction time is in the range of 5 to 10 hours. However, if it is desired, higher yields of products can be obtained in some instances if the reaction time is extended to from about 5 to about 10 days.

The products of the process of this invention can be readily separated from the reaction mixture by techniques familiar to a skilled practitioner. Applicable techniques include distillation, extraction, crystallization, chromatography and the like.

In the following examples, all parts are parts by weight unless otherwise noted.

*Example I*

A solution comprising 1.62 grams of benzoyl isonitrile chromium pentacarbonyl (chromium-pentacarbonyl-benzoyl-$\binom{C}{N}$)

in 100 mls. of anisole, was refluxed for 3.5 hours during which time 540 mls. of gas was evolved. This reaction was carried out under nitrogen. The reaction mixture became fairly dark during the reaction and chromium hexacarbonyl was observed subliming in the condenser. A total of 0.3 gram of chromium hexacarbonyl, having a melting point of 153–154° C. was so isolated. The solvent was then removed from the unfiltered reaction mixture to yield an oily residue. An infrared spectrum of the trap distillate indicated only anisole to be present. The oily residue was evaporatively distilled overnight to give a clear viscous yellow liquid. The infrared spectrum of this liquid indicated the possible presence of anisole, anisole chromium tricarbonyl, and p-methoxy benzophenone with no evidence for the presence of the starting material,

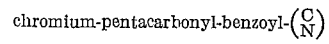
chromium-pentacarbonyl-benzoyl-$\binom{C}{N}$

The liquid was chromatographed on alumina to yield anisole, 0.12 gram of anisole chromium pentacarbonyl, and 0.10 gram of p-methoxy benzophenone having a melting point of 60–61° C. The infrared spectrum of this product was identical to that of a pure sample of p-methoxy benzophenone, prepared by an independent route.

The product p-methoxy benzophenone is a well-known organic compound having well known utilities in organic synthesis.

When phenetole is employed in place of anisole in the above example, the product is p-ethoxy benzophenone.

*Example II*

One mole of isobutyryl isonitrile chromium pentacarbonyl is reacted with 15 moles of diphenylether for three hours at the reflux temperature of the system. The product is isopropyl 4-phenoxyphenyl ketone. When isopropyl 4-phenoxyphenyl ketone is reacted with additional isobutyryl isonitrile chromium pentacarbonyl, the product is bis(4-isobutyrylphenyl) oxide.

*Example III*

One mole of phenylacetyl isonitrile chromium pentacarbonyl is reacted for four hours with 30 moles of phenylcyclohexyl ether at 70° C. The product, which is separated from the reaction mixture by chromatography, is benzyl 4-cyclohexylphenyl ketone.

*Example IV*

One mole of p-methylbenzoyl isonitrile chromium pentacarbonyl is reacted with a tetrahydrofuran solution of 5 moles of phenyl 2-cyclohexenyl ether at 80° C. The product is p-methylphenyl 4[-2-cyclohexenyl] phenyl ketone.

*Example V*

Following the procedure of Example I, one mole of benzoyl isonitrile chromium pentacarbonyl is reacted with 15 moles of N,N-dimethylaniline at the reflux temperature of the system. The product is N,N-dimethylaminophenyl phenyl ketone. Similarly, isobutyryl isonitrile chromium pentacarbonyl is reacted with N,N-diethylaniline to yield N,N-diethylaminophenyl isopropyl ketone.

*Example VI*

One mole of 2-phenylacetyl isonitrile chromium pentacarbonyl is reacted with a chloroform solution of 20 moles of N,N-di-n-hexyl aniline at 50° C. for 5 days. The produce is N,N-di-n-hexylaminophenyl benzyl ketone. Similarly, 4-methylbenzoyl isonitrile chromium pentacarbonyl is reacted with N,N-dicyclohexylaniline. The product is N,N-dicyclohexylaminophenyl-p-methylphenyl ketone.

*Example VII*

One mole of 2-methyl 3-cyclohexylbutyryl isonitrile chromium pentacarbonyl is reacted with a n-nonane solution of 20 moles of triphenylamine at 180° C. The product is N,N-diphenyl aminophenyl 2-methyl 3-cyclohexy isopropyl ketone. Similar results are obtained when 2-methyl 3-cyclohexenylbutyryl isonitrile chromium pentacarbonyl is reacted with triphenylamine. The product is N,N-diphenyl aminophenyl 2-methyl 3-cyclohexenyl isopropyl ketone.

*Example VIII*

One mole of cinnamoyl isonitrile chromium pentacarbonyl is reacted with 2 moles of N,N-dimethylaniline dissolved in 100 moles of n-hexane at the reflux temperature of the system. The product is N,N-dimethylaminophenyl styryl ketone.

*Example IX*

Following the procedure of Example I, phenylacetate, one mole, is reacted with one mole of benzoyl isonitrile chromium pentacarbonyl. The product is acetoxyphenyl phenyl ketone. Similarly, when phenyl 2-cyclohexylacetate is reacted with benzoyl isonitrile chromium pentacarbonyl, the product is 2-cyclohexylacetoxyphenyl phenyl ketone.

Following the same procedure, 2,2,2′,2′-tetramethyl biphenoyl isonitrile chormium pentacarbonyl yields acetoxyphenyl 2,2,2′,2′,-tetramethylbiphenyl ketone upon reaction with phenyl acetate. Similarly, phenyl 1,2,3,4,5-pentamethylbenzoate reacts with benzoyl isonitrile chromium pentacarbonyl to yield 1,2,3,4,5- pentamethylbenzoyloxyphenyl phenyl ketone.

*Example X*

A n-hexane solution of 10 moles of toluene is reacted with one mole of benzoyl isonitrile chromium pentacarbonyl at 40° C. for three days. The product is p-methyl benzophenone. Similarly, biphenyl is reacted with isobutyryl isonitrile chromium pentacarbonyl to yield isopropylbiphenyl ketone.

The ketones produced by the products of this invention are useful as solvents and as additives for wax and grease formulations. They are also useful as chemical intermediates. For example, they can be reacted with 2,4-dinitrophenyl hydrazine to yield the corresponding 2,4-dinitrophenyl hydrazones. Similarly, the oximes, bisulfites and cyanohydrins can be prepared by reaction of one of the ketones with hydroxylamine, sodium bisulfite and hydrogen cyanide respectively.

Having fully defined the novel compounds of my invention, their mode of preparation, and their many utilities, I desire to be limited only within the lawful scope of the appended claims.

I claim:
1. Process for the preparation of a ketone, said process comprising reacting a compound selected from the class consisting of

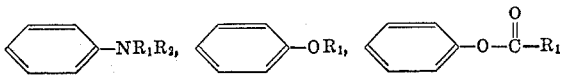

and

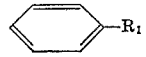

wherein $R_1$ and $R_2$ are hydrocarbon radicals having from 1 to about 8 carbon atoms, said radicals being selected from the class consisting of alkyl, aryl, cycloalkyl, alkaryl, and alkenyl radicals;

with an acyl isonitrile chromium pentacarbonyl having the formula

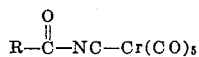

wherein R is a hydrocarbon radical having from 1 to about 16 carbon atoms, said radical selected from the class consisting of alkyl, cycloalkyl, aralkyl, aryl, alkaryl, alkenyl and cycloalkenyl radicals.

2. The process of claim 1 being carried out at a temperature of from about 50 to about 200° C.

3. The process of claim 2 being carried out in the presence of an excess of said compound.

4. The process of claim 3 wherein said acyl isonitrile chromium pentacarbonyl is benzoyl isonitrile chromium pentacarbonyl.

5. The process of claim 3 wherein said acyl isonitrile chromium pentacarbonyl is isobutyryl isonitrile chromium pentacarbonyl.

6. Process for the preparation of p-methoxybenzophenone, said process comprising reacting anisole with benzoyl isonitrile chromium pentacarbonyl.

7. The process of claim 6 wherein an excess of anisole is employed.

References Cited by the Examiner

UNITED STATES PATENTS 3,136,797   6/1964   Maginn _____ 260—438

LEON ZITVER, *Primary Examiner.*

DANIEL D. HORWITZ, *Examiner.*